United States Patent

Catlin

[15] 3,663,999
[45] May 23, 1972

[54] AUTOMATIC MACHINE TOOL CONTROL MECHANISM

[72] Inventor: Francis D. Catlin, Horseheads, N.Y.
[73] Assignee: Hardinge Brothers, Inc., Elmira, N.Y.
[22] Filed: Jan. 23, 1970
[21] Appl. No.: 5,292

[52] U.S. Cl. ................................29/44, 29/65, 82/21 B, 82/34 D
[51] Int. Cl. ..........................................B23b 21/00
[58] Field of Search.............29/44, 42, 39, 65; 82/34 D, 82/21 A, 21 B

[56] References Cited

UNITED STATES PATENTS

| | | |
|---|---|---|
| 2,579,998 | 12/1951 | Bullard et al............................29/42 X |
| 3,300,013 | 1/1967 | Fisher...................................82/34 D |
| 3,211,978 | 10/1965 | Cottin....................................82/21 A |
| 2,952,168 | 9/1960 | Leifer....................................29/42 X |
| 3,492,897 | 2/1970 | Cunningham et al..................82/34 D |

Primary Examiner—Andrew R. Juhasz
Assistant Examiner—Z. R. Bilinsky
Attorney—Shlesinger, Arkwright & Garvey

[57] ABSTRACT

An automatic machine tool including a bed, a head stock having a spindle and mounted at one end of the bed, a carriage mounted for longitudinal travel on the bed, and carrying a cross-slide, a turret mounted on the cross-slide for travel transversely of the bed, a programming mechanism mounted on the positioned laterally of the bed, and means operatively connecting the carriage, the cross-slide, the turret, and the programming mechanism.

21 Claims, 18 Drawing Figures

Patented May 23, 1972

INVENTOR.
Francis D. Catlin

BY

Schlesinger, Arkwright & Garvey
ATTORNEYS

Patented May 23, 1972

INVENTOR.
Francis D. Catlin

BY

Shlesinger, Arkwright, & Garvey
ATTORNEYS

Patented May 23, 1972

INVENTOR.
Francis D. Catlin

BY

Shlesinger, Arkwright & Garvey
ATTORNEYS

Patented May 23, 1972

INVENTOR.
Francis D. Catlin

BY

Shlesinger, Arkwright & Garvey
ATTORNEYS

Patented May 23, 1972

INVENTOR.
Francis D. Catlin

BY

Shlesinger, Arkwright & Garvey
ATTORNEYS

Patented May 23, 1972

INVENTOR.
Francis D. Catlin
BY
Shlesinger, Arkwright & Garvey
ATTORNEYS

Patented May 23, 1972

INVENTOR.
Francis D. Catlin

BY

Shlesinger, Arkwright & Garvey
ATTORNEYS

3,663,999

AUTOMATIC MACHINE TOOL CONTROL MECHANISM

This invention relates to an automatic machine tool, and more particularly to an automatic machine tool control mechanism.

HISTORY AND OBJECTS

This invention is an improvement over U.S. Pat. No. 3,224,070 to Cunningham.

The type of machine tool to which this invention relates is the type commonly referred to as "chucking machines" which are used to finish with precision a work piece.

More particularly, this invention relates to the hydraulic, electric, and mechanical controls for a machine tool of this type which enable precision work to be carried out rapidly and efficiently.

One of the disadvantages of the machine tools of the prior art has been their relatively large size with respect to the number of operations that can be controlled by the programming mechanism. Thus one of the prime objects of the present invention has been to reduce the overall size of the machine, and yet increase the number of operations which can be controlled by the machine, as well as improving the overall versatility of the machine.

A primary object of this invention is to provide a machine tool of overall reduced dimensions yet increased capacity.

Another object of this invention is to provide a machine tool having a programming mechanism for controlling a complete cycle of operations on a work piece.

Yet a further object of this invention is to provide an improved machine tool of the second operation type.

Another object is to provide a programming arrangement for a machine tool which can be easily changed to adapt itself to an infinite number of control operations.

Still a further object of this invention is to provide a machine which can be easily set up to follow a program of machine cutting operations, such as those performed by a turret slide, cross-slide, or cut off mechanism as well as operations such as speed change or stockfeed which, when once set up to perform these operations in a certain sequence, will automatically repeat this cycle and produce identical finished parts until shut off.

These and other objects and advantages of this invention will become apparent when considered in view of the following description and claims and the drawings in which:

DESCRIPTION OF THE INVENTION

Figure 1:
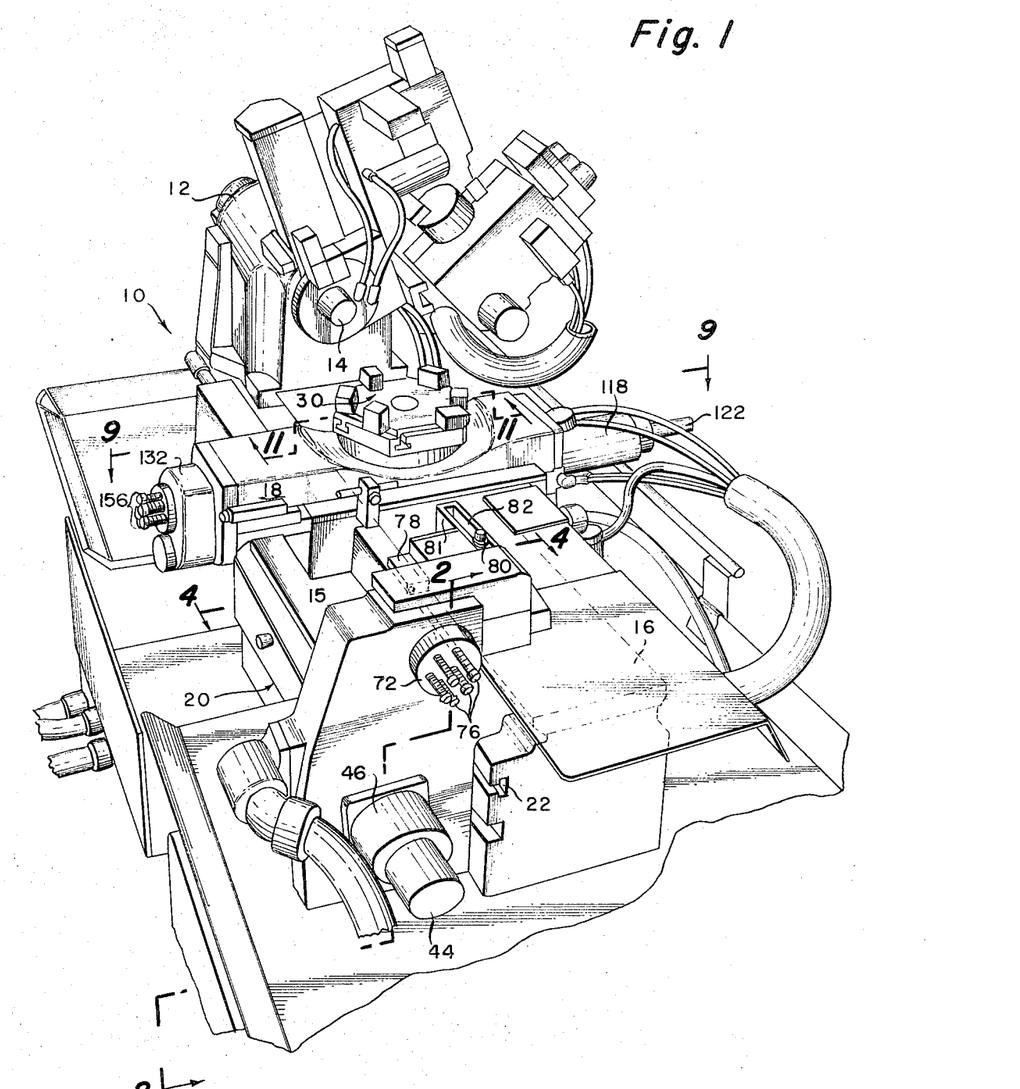
FIG. 1 is a perspective view of the machine tool of this invention.

In FIG. 1, the machine tool 10 is shown having a headstock 12 with a spindle 14. The bed 16 extends from the headstock 12, and has mounted thereon the carriage 15 and cross-slide 18 and programming mechanism 20.

Figure 4:
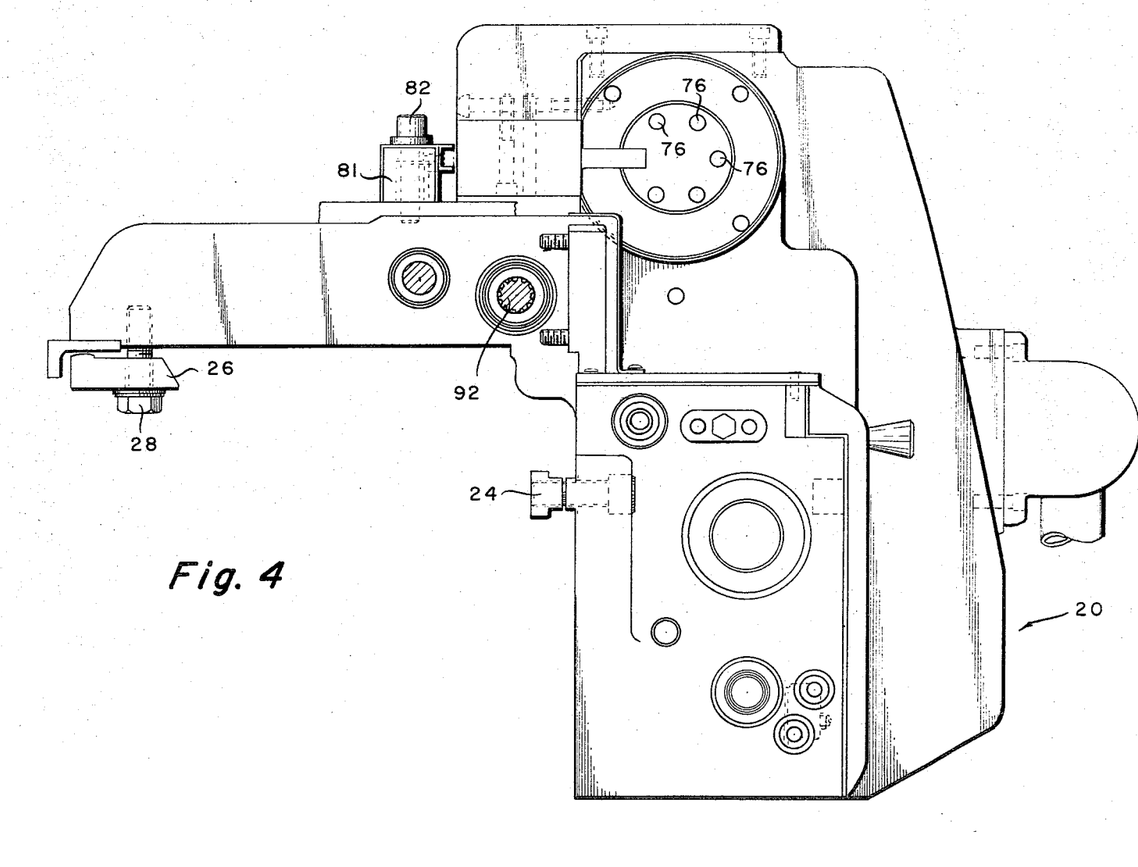
FIG. 4 is a view along lines 4—4 of FIG. 1 and viewed in direction of the arrows.

The bed 16 has a T-shaped slot 22, and as seen in FIG. 4, the programming mechanism 20 carries two T-shaped bolts 24 one at each end thereof which fits in slot 22. Additionally, there is a clamp 26 secured to the mechanism 20 by bolt 28. Clamp 26 is shaped to conform to the dove-tail shape of bed 16. By means of the bolts 24 and 28, the position of the programming mechanism 20 may be shifted longitudinally along bed 16 by first loosening bolts 24 and 28. When the desired position of the programming mechanism 20 is located, bolts 24 and 28 are tightened to securely clamp it onto the bed 16 in the desired position.

Referring back to FIG. 1, the cross-slide 18 is mounted on a carriage 15 secured to bed 16 in such a manner as to permit longitudinal travel of the cross-slide 18 on the bed 16. Mounted on cross-slide 18 is a tool carrying turret 30. This turret is of the type disclosed in U.S. Pat. No. 3,464,292 to Parsons et al. and assigned to the same assignee as the present invention. For this reason, the turret will only be described to the extent that it relates to this invention.

Figure 11:
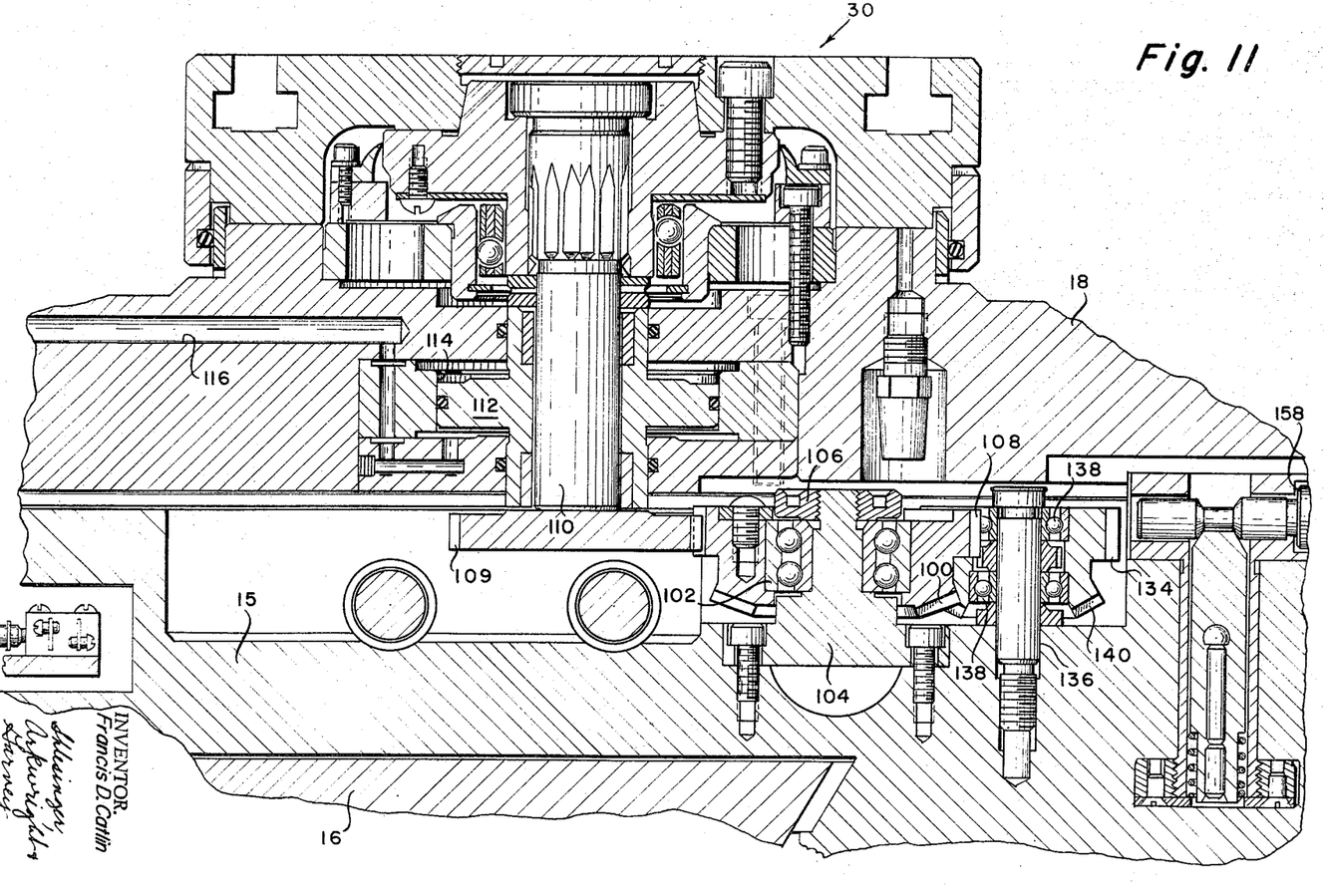
FIG. 11 is a section taken along lines 11—11 of FIG. 1 and viewed in the direction of the arrows.

The turret 30 is mounted on the cross-slide 18 as seen in FIG. 11. Cross-slide 18 is adapted to slide with respect to carriage 15 in a direction transverse to that of the bed 16.

Figure 2:
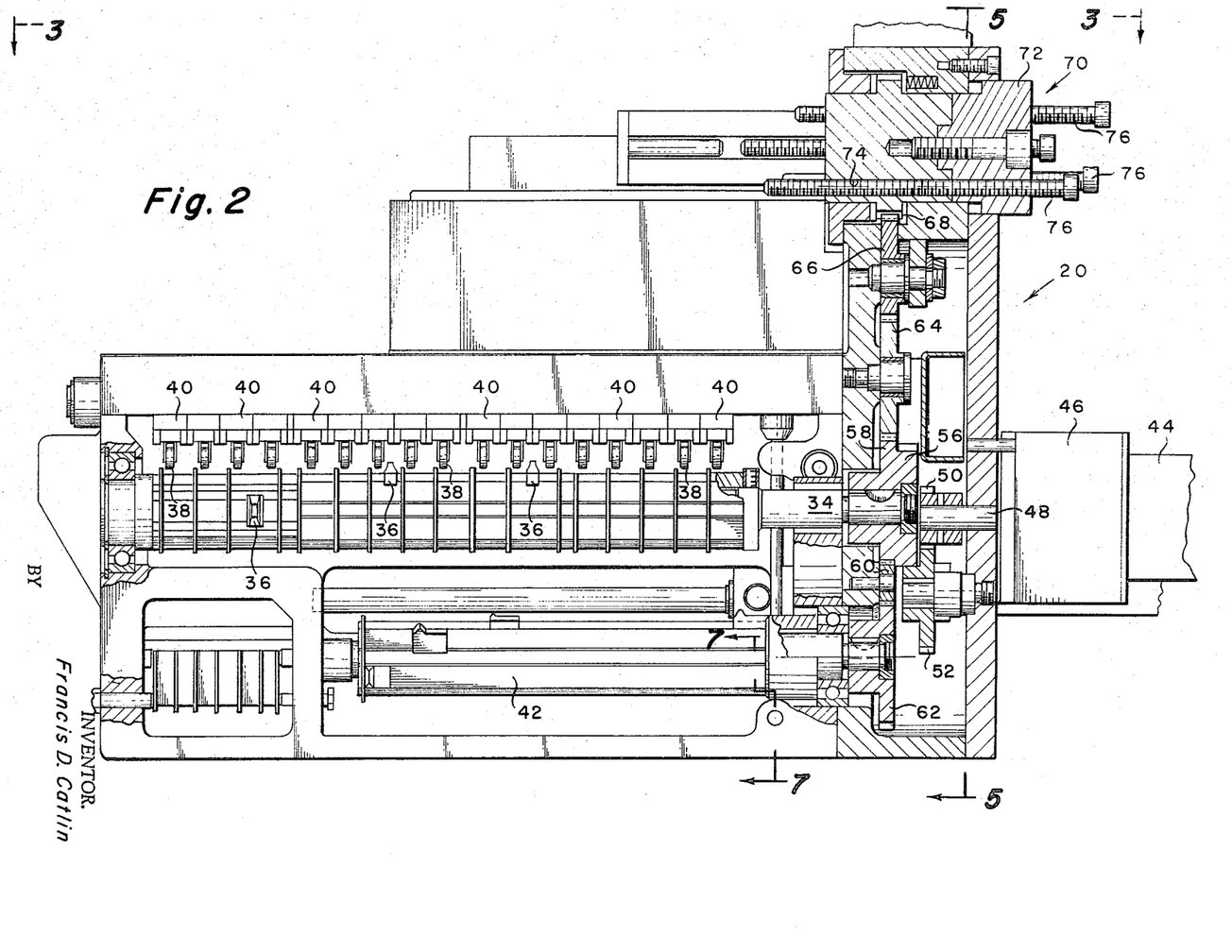
FIG. 2 is a view along lines 2—2 of FIG. 1 and viewed in the direction of the arrows.

Referring now to FIG. 2, the programmer mechanism 20 may be seen with the cover removed. This programming mechanism is similar to that disclosed in U.S. Pat. No. 3,224,070 but is capable of controlling many more functions than the earlier patent. The mechanism includes a programmer shaft 34 having a plurality of moveable cams 36 thereon. These cams 36 may be moved into position so that they will contact rollers 38 on switches 40, each of which controls a different function of the machine. Thus in the case of a six station turret, the programmer shaft would be six sided, each side containing a plurality of cams 36 for controlling the functions of the machine for each station of the turret 30.

The programming mechanism also includes a feed position shaft 42 which is identical in design and function to the lower shaft shown on FIG. 12 of U.S. Pat. No. 3,224,070.

Since this programming mechanism is used with a six station turret, it is necessary for each of the programming shafts 34 and 42 to be indexed one-sixth of a revolution for each changing position of the turret 30. In order to provide this indexing, an electric motor 44 is provided. This motor is a high speed DC motor which is utilized in order to keep its size relatively small. The speed of the motor 44 is reduced through an integral planetary reducer 46, the output shaft 48 of which has a spur gear 50 secured thereto. Spur gear 50 is a driver of a Geneva Motion which indexes shaft 34 one-sixth of a revolution at a time. Gear 50 is engaged with a gear 52 having mounted thereon Geneva Driving rollers 54. Rollers 54 engage Geneva wheel 56 in such a manner that one revolution of gear 50 causes one-half a revolution of the Geneva Driving rollers 54 and one-sixth of a revolution of Geneva driven wheel 56. Wheel 56 is secured to shaft 34, and in this manner shaft 34 is indexed one-sixth of a revolution at a time.

Integrally formed with Geneva wheel 56 is gear 58 which drives an idler gear 60 which in turn drives gear 62 secured to shaft 42. Thus, one-sixth of a revolution of shaft 34 is accompanied by a one-sixth revolution of shaft 42. Gear 58 also engages an idler gear 64 which in turn engages another idler gear 66 which drives a gear 68 which is formed on the body of stop drum 70. This stop drum 70 consists of a generally cylindrical housing 72 having six radially spaced internally threaded holes 74 for receiving threaded stop screws 76. Stop screws 76 may be adjusted longitudinally by turning them in or out to the desired position. These stop screws serve to limit the longitudinal travel of carriage 15. Thus by rotation of the stop drum 70 by means of gears 64 and 66, each of the different stop screws 76 may be brought into position, and the travel of the carriage 15 may vary on each cycle of operation.

As seen in FIG. 1, the stop screws 76 abut against a stop mechanism 78 which is described in Parsons U.S. application Ser. No. 802,464 now U.S. Pat. No. 3,589,219 dated June 29, 1971 filed Feb. 26, 1969 and assigned to the same assignee as the present invention. The carriage 15 may be allowed to travel a greater or lesser distance from the stop drum 70 by an initial adjustment of the stop bar 81 on the carriage. This is done by loosening the screw 80 which passes through slot 82 in stop bar 81 may be moved to the desired position and then secured by means of screw 80. The operation of the stop mechanism 78 is fully described in application Ser. No. 802,464 now U.S. Pat. No. 3,589,219 dated June 29, 1971 and should require no further description here.

Figure 5:
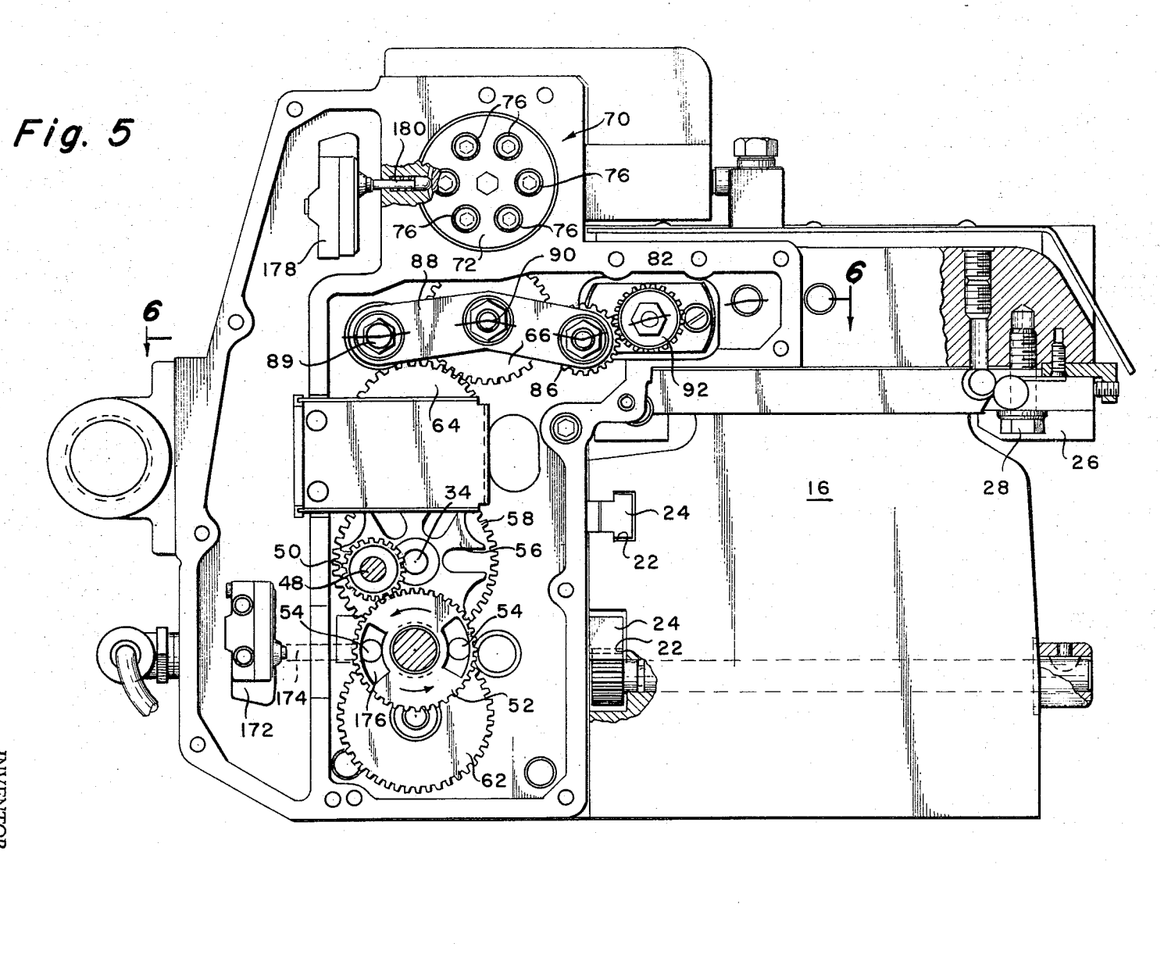
FIG. 5 is a view along lines 5—5 of FIG. 2 and viewed in the direction of the arrows.
Figures 6, 7, 8:
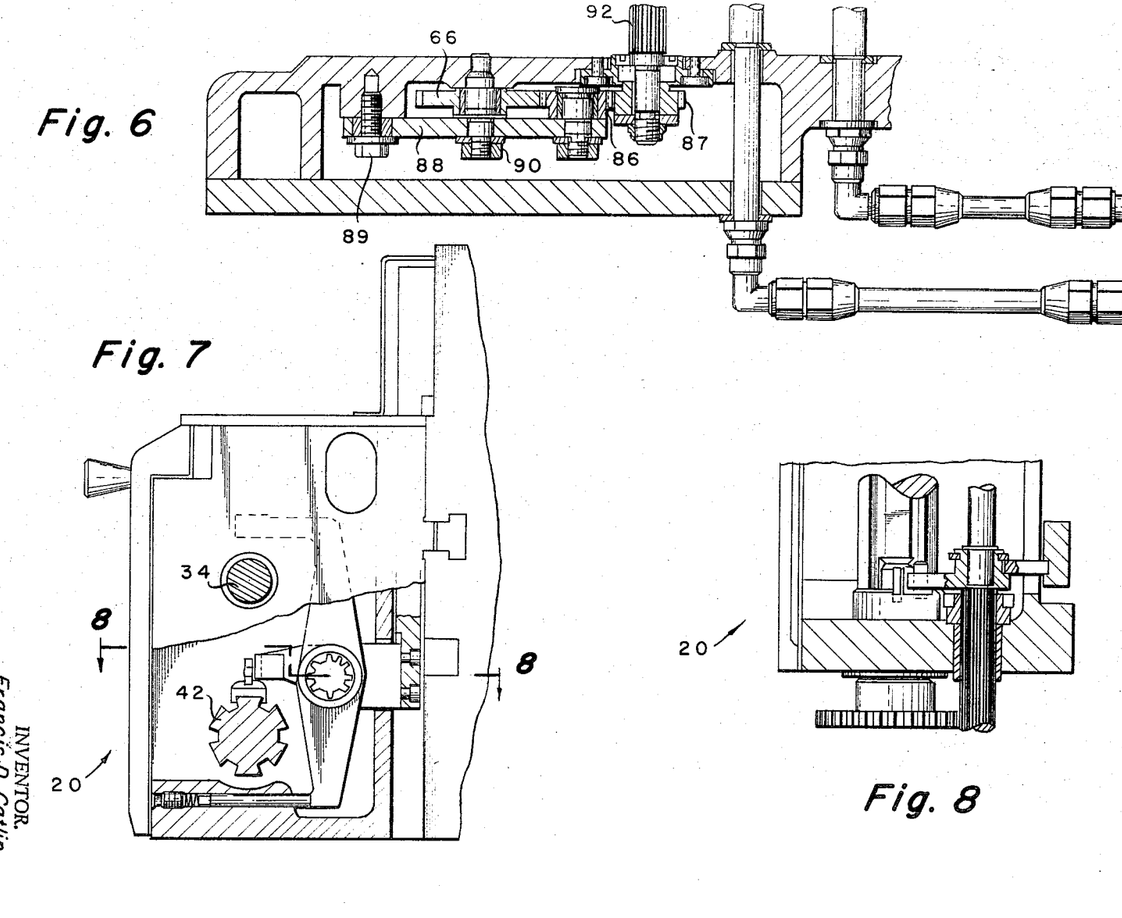
FIG. 6 is a view along lines 6—6 of FIG. 5 and viewed in the direction of the arrows.
FIG. 7 is a view along lines 7—7 of FIG. 2 and viewed in the direction of the arrows.
FIG. 8 is a view along lines 8—8 of FIG. 7 and viewed in the direction of the arrows.

Referring now to FIG. 5, the means by which the programmer mechanism 20 is operatively connected to the carriage 15 is shown. The idler gears 64 and 66 of the indexer are shown drivingly connecting the Geneva gear mechanism and the stop drum 70. Engaging gear 66 is an additional idler gear 86 carried by an idler arm 88. Arm 88 is pivoted at its centerpoint 90. Gear 86 engages a gear 87 mounted on splined shaft 92 in such a manner that rotation of gear 66 produces a resultant rotation of idler gear 86, gear 87, and shaft 92.

Any play between gears 86 and 87 which may result as due to wear of the carriage 15 on bed 16 may be taken up by means of idler arm 88 which may be pivoted about point 90 and locked by screw 89.

Figure 12:
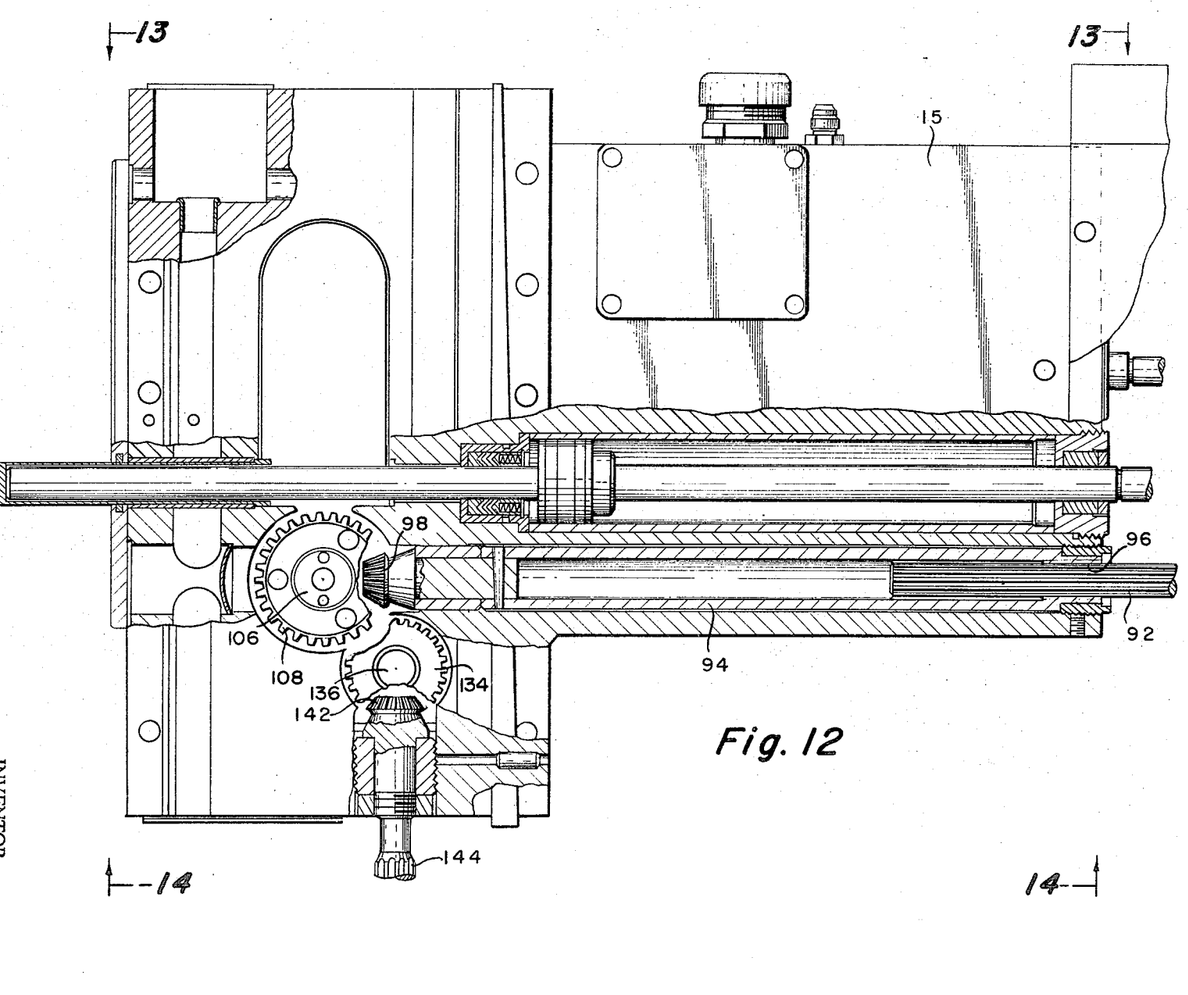
FIG. 12 is a fragmentary top plan view of the carriage and cross-slide assembly with the turret assembly removed and parts broken away for purposes of illustration.
Figure 13:
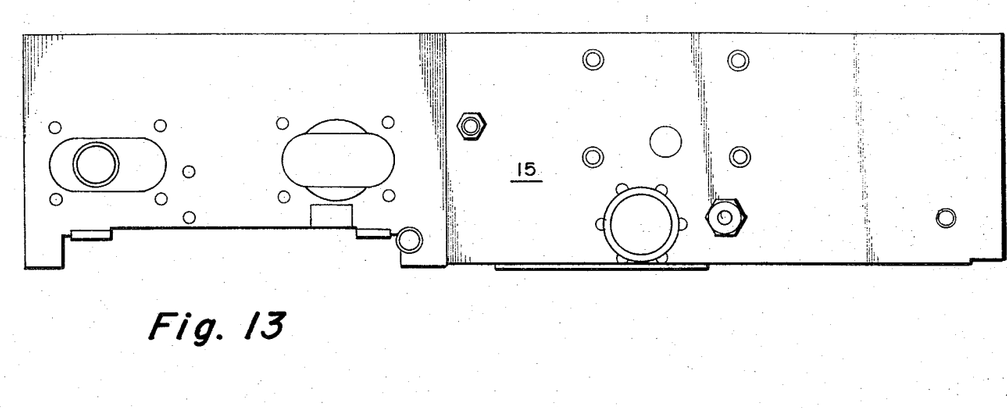
FIG. 13 is a view along lines 13—13 of FIG. 12 and viewed in the direction of the arrows.
Figure 14:
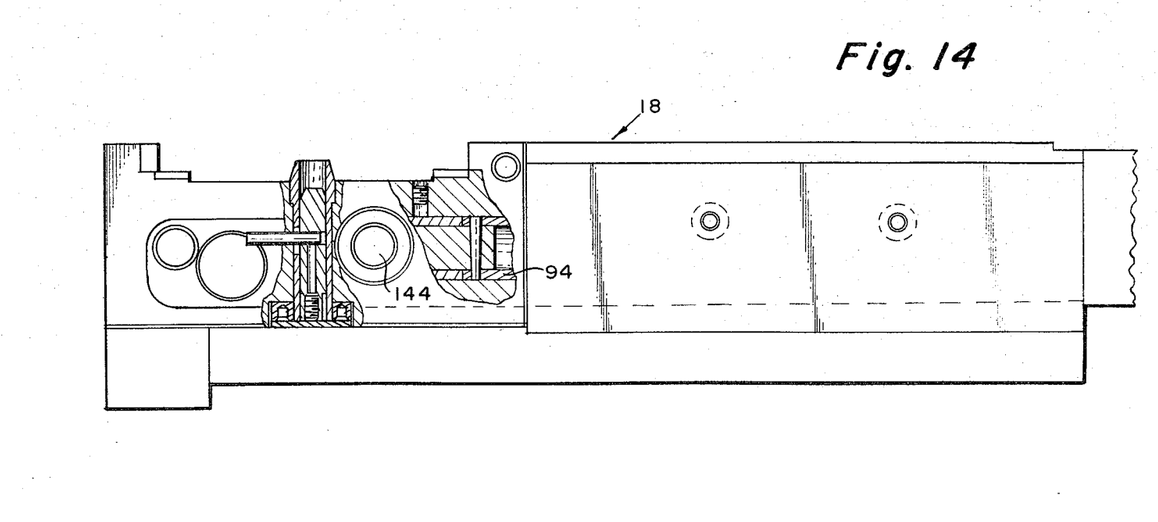
FIG. 14 is a view along lines 14—14 of FIG. 12 and viewed in the direction of the arrows.

FIG. 12 illustrates the connection between the programmer mechanism 20 and the carriage 15 by means of splined shaft 92. Within carriage 15 is a splined tubular sleeve 94 having internal splines 96 at one end thereof which are adapted to mate with splines of shaft 92. Thus while the shaft 92 remains in rotary phased relationship with tube 94, axial motion between shaft 92 and tube 94, and thus between carriage 15 and programmer mechanism 20, is permitted as the shaft 92 slides within the splines 96 of tube 94.

On the other end of tube 94 is attached a bevel pinion gear 98. Engaging pinion 98 is a bevel ring gear 100 secured to the carriage 15 by means of bearing 102, support 104, and nut 106 as best seen in FIG. 11. Integrally formed with bevel ring gear 100 is a gear 108 which meshes with a gear 109 secured to post 110 extending downwardly from turret 30. As described in U.S. Pat. No. 3,464,292, turret 30 is of the type which must be raised in order to be turned for indexing. The raising of turret 30 is accomplished by means of piston 112 secured to post 110 and lying within cylinder 114. In order to raise the turret 30, fluid pressure is supplied to the lower side of piston 112 through port 116 thus raising piston 112, post 110, turret 30 and gear 109. The interengagement of gear 108 and 109 is such that this relative motion is accommodated without the disengagement of the two gears. Thus turret 30 may be lifted and when lifted, it may be rotated by gears 108 and 109.

Indexing of turret 30 is accomplished when turret 30 is raised, by the rotation of the splined shaft 92, sleeve 94, and gears 98, 100, 108 and 109. Accordingly, thus far, simultaneous indexing of programmer shafts 34 and 42, stop drum 70, and turret 30 is accomplished.

In order to provide for lateral movement of the turret 30 the cross-slide 18 is provided with a hydraulic cylinder 118 having hydraulic piston 120 therein. Piston 120 is carried on a piston rod 122 which is secured to the carriage 15 as at 124. Thus the application of hydraulic pressure to either side of piston 120 will result in lateral motion of the turret 30 and cross-slide 18.

As the turret 30 moves to the left in FIG. 11, it will be seen that gears 108 and 109 come out of engagement. This provides a means whereby turret 30 may not be indexed when it is out of the position shown in FIG. 11. A switch 126 is located on the carriage 15 adjacent the hydraulic cylinder 118. A plunger 128 provides a mechanical linkage which will abut the cylinder 118 when the turret 30 is returned to the indexing position. In this manner, switch 126 provides an electrical signal to the indexing mechanism that the turret 30 has returned to the indexing position. Secured to the opposite end of the cross-slide 18 as by bolts 130 is a second stop drum 132. Stop drum 132 is similar in structure to stop drum 70, however, stop drum 132 limits the lateral travel of the cross-slide 18.

Figure 17:
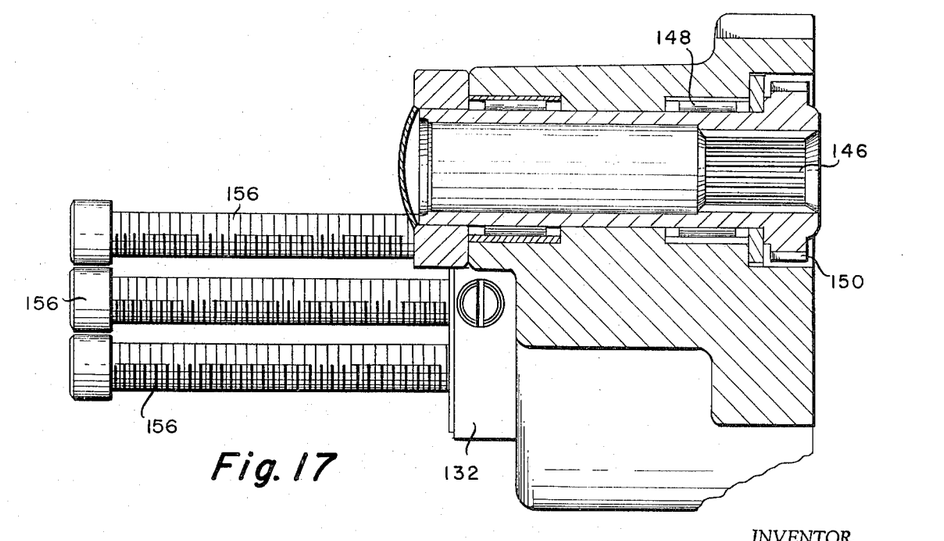
FIG. 17 and 18 are enlarged cross sectional view of the cross-slide stop drum.

In FIG. 11 a gear 134 is mounted on shaft 136 by means of bearings 138. Gear 134 is meshed with gear 108 and rotates therewith. Integrally formed with gear 134 is a beveled pinion 140 seen in FIG. 11. Beveled pinion 142 seen in FIG. 12 meshes with pinion 140 and is secured to the end of a splined shaft 144 which extends in the direction of the stop drum 132. Referring now to FIG. 17, the housing enclosing stop drum 132 is seen to have a splined sleeve 146 secured therein by bearings 148. Integrally formed with the splined end of sleeve 146 is a gear 150. Gear 150 is in mesh with a gear 152 seen in FIG. 18, and gear 152 is secured to the stop drum 132. Stop drum 132 includes six threaded stop screws 156 which may be axially adjusted within the stop drum 132.

Figure 18:
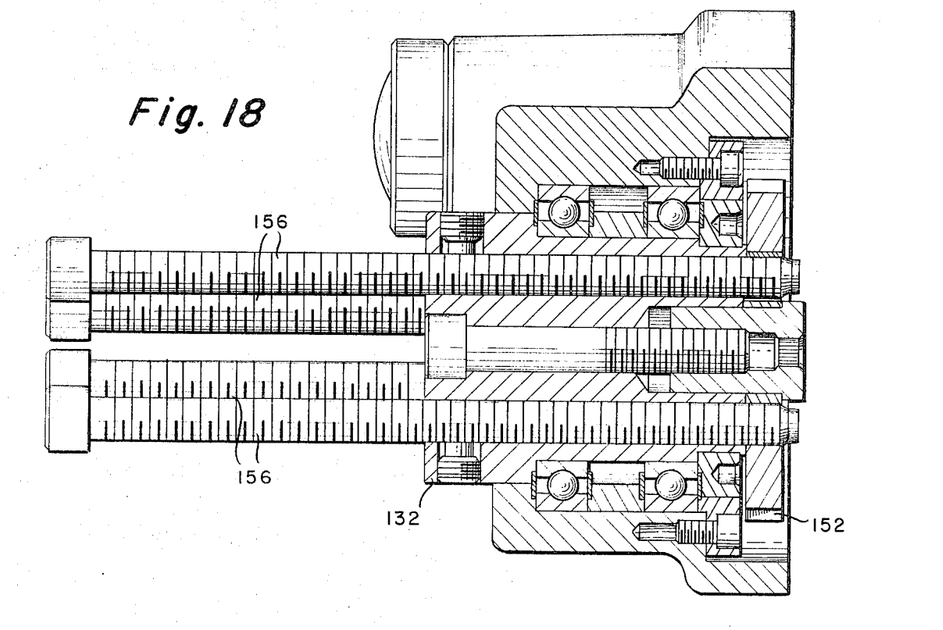

By means of the mechanism just described, stop drum 132 may be rotated to bring any one of the stop screws 156 into position for engagement with stop 158. In this manner, the lateral travel of turret 30 and cross-slide 18 may be controlled by the stop drum 132.

Figures 9, 10:
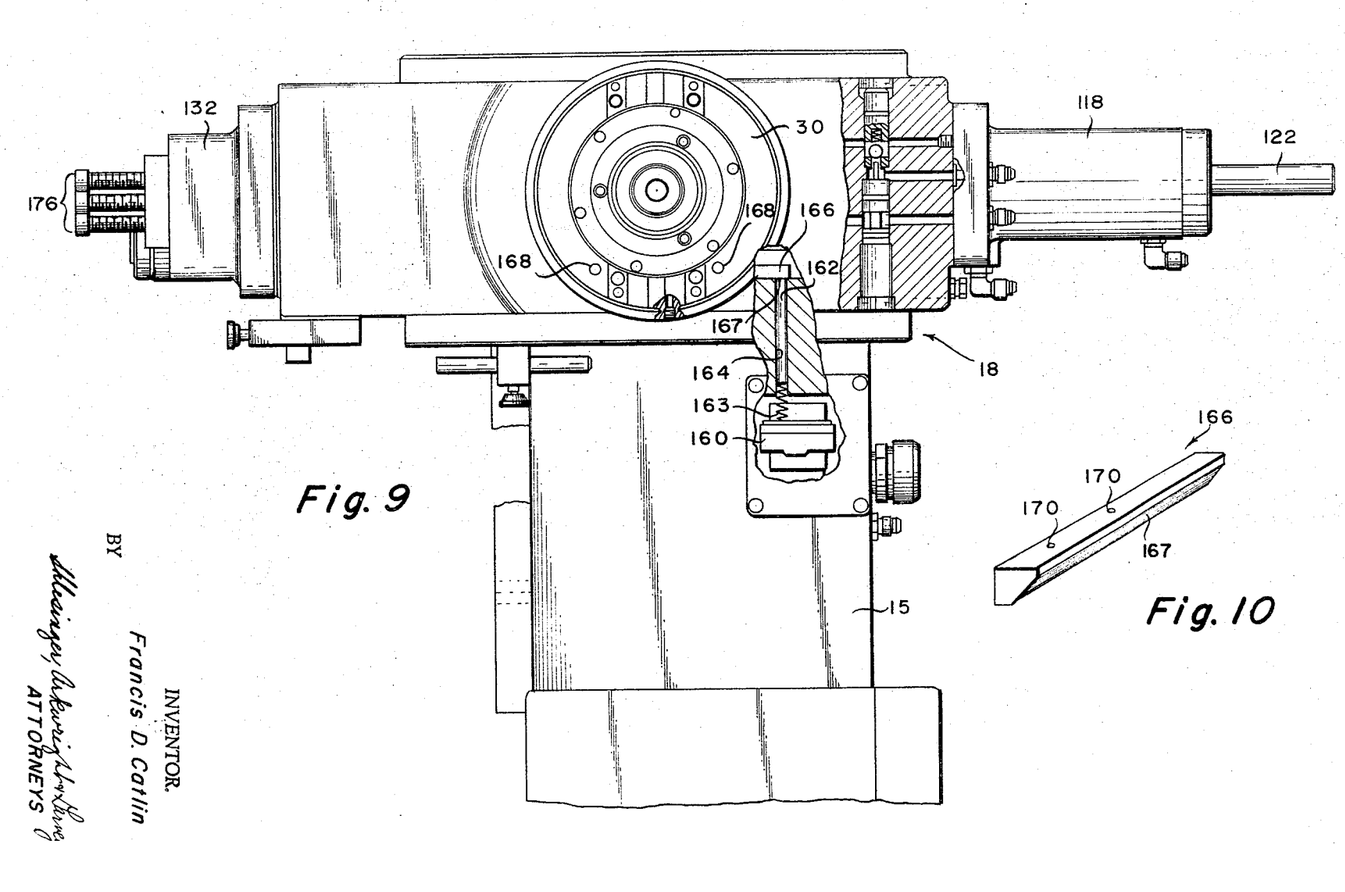
FIG. 9 is a top plan view of the carriage, cross-slide and turret assembly taken along lines 9—9 FIG. 1 and viewed in the direction of the arrows.
FIG. 10 is a perspective view of the trip actuator bar which operates with the turret assembly.

With reference to FIGS. 9 and 10, it has been found necessary to provide an electric signal to the programming mechanism 20 to indicate that the turret 30 has lifted from its seat and is ready for indexing in the manner previously described. This is accomplished by means of switch 160 secured in the carriage housing 15. A plunger 162 is positioned within bore 164 within the carriage 15. Plunger 162 has a rounded end which contacts trip bar 166 at the cam surface thereof 167. The plunger 162 is urged into contact with trip bar 166 by spring 163. Trip bar 166 is attached to cross-slide 18 by means of two screws 168 which pass through the cross-slide 18 to holes 170 on trip bar 166. The screws 168 are shouldered and the holes in the cross-slide through which they pass are counterbored to form space for springs which urge the screws and the attached trip bar upwards towards the turret 30. Thus when the turret 30 is raised allowing trip bar 166 to move upwards, plunger 162 closes switch 160 and permits the indexing cycle to begin. After the turret 30 has been indexed, and is lowered into its operative position, forcing trip bar 166 downward cam surface 167 forces plunger 162 back inwardly toward the switch 160 and opens the switch 160 thus preventing further indexing of the turret 30.

In FIG. 5, a switch 172 is provided to indicate when the indexing step is proceeding. Plunger 174 contacts the switch 172 and the other end of the plunger 174 rides on cam surfaces 176 on the Geneva gear 52. As the Geneva gear 52 is being rotated by motor 44, plunger 174 rides along cam surface 176 until the Geneva driving gear 52 is about to impart motion to the Geneva driven gear 56. At this point, plunger 174 falls off of the cam surface 176 and closes switch 172. This provides a signal that the indexing step is about to proceed.

A switch 178 is provided adjacent to the stop drum 70 and includes a plunger 180 which contacts cam surfaces (not shown) on the stop drum 70. When the carriage is forward against the stop this switch is closed and when away from the forward position the switch is open. It functions in the indexing cycle in a manner later described.

Figure 3:
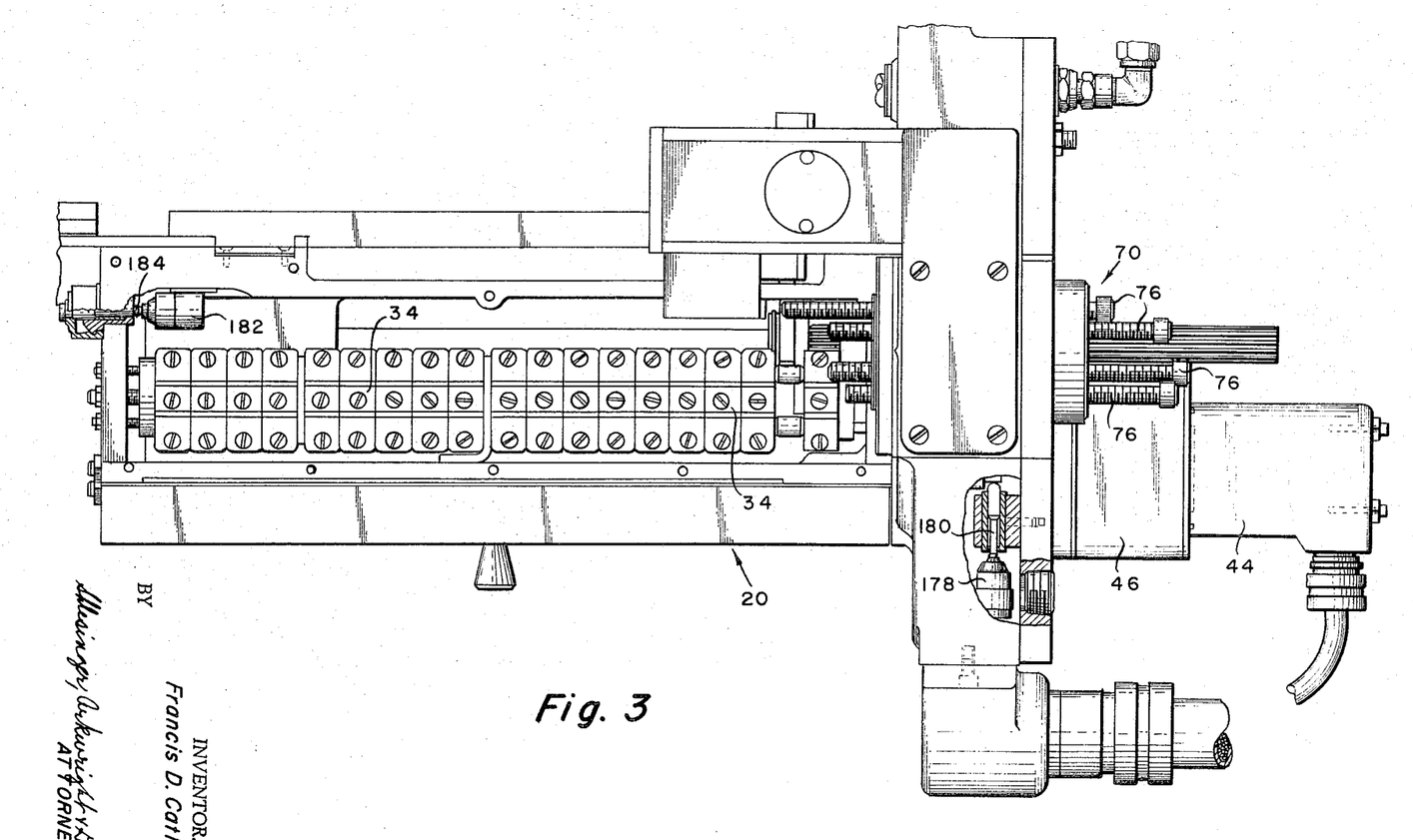
FIG. 3 is a view along lines 3—3 of FIG. 2 and viewed in the direction of the arrows.

With reference to FIG. 3, an additional switch 182 is provided at the end of the programmer mechanism. This switch 182 is operated by a plunger 184 and provides a signal to the indexing mechanism 20 that the carriage 15 has returned to the indexing position at the completion of a cutting cycle. The carriage 15 strikes the plunger 184 and closes the switch 182 thus providing the necessary signal.

Figure 15:
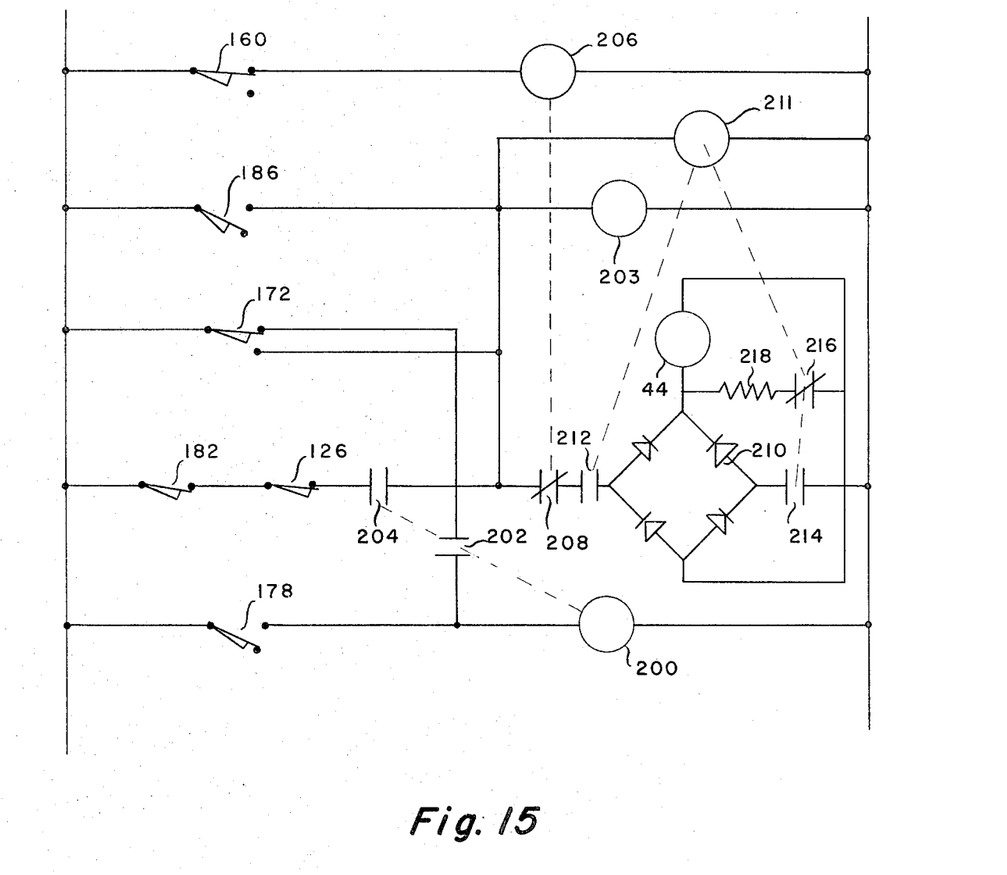
FIG. 15 is a schematic illustration of a portion of the electrical circuitry of this invention.
Figure 16:
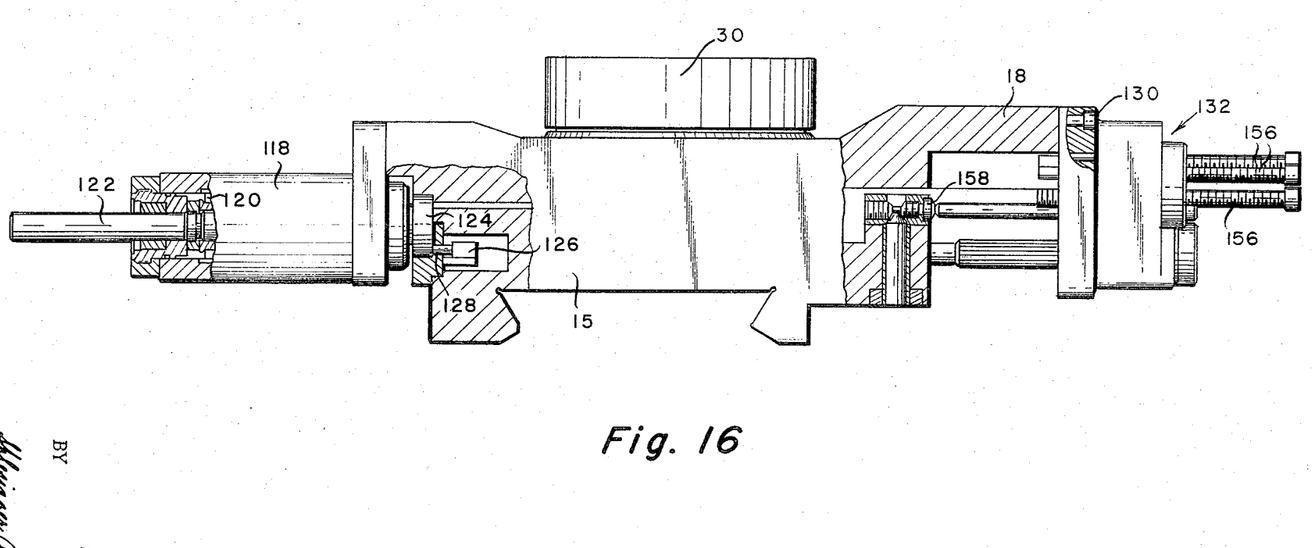
FIG. 16 is a plan view of the carriage assembly with parts broken away for purposes of illustration.

Referring now to the electrical circuit shown in the FIG. 15, an indexing cycle will now be described. This cycle is initiated during the automatic cycle of the machine by both the carriage home switch 182 and the cross-slide-out switch 126 being closed at the same time when a path of the carriage 15 and cross-slide 18 has been completed. Any path through which they can travel will end with both slides at the home position. At some time during the previous cycle of the carriage 15 and the cross-slide 18, the turret forward switch 178 had been closed. This had energized the relay 200 and it was held closed by a hold circuit through the Geneva indexed switch 172 and the contact 202. Thus, when the carriage home switch 182 and the cross-slide-out switch 126 are both closed, the lift solenoid 203 which permits fluid to flow into cylinder 114 and relay 211 are energized through switches 126 and 182 and closed contact 204. This shifts a hydraulic valve (not shown), valving fluid into the lower end of the cylinder 114 and raising the turret plate 30 for indexing. When this occurs the lift turret switch 160 opens dropping the relay 206 which had been closed. This in turn energizes the full wave bridge rectifier 210 feeding the indexing motor 44 through the carriage home switch 182, cross-slide-out switch 126, contacts 204, 208, 212 and 214. At the same time a contact 216 disconnects the resistance 218 from across the motor armature and the motor 44 runs starting the indexing cycle.

At approximately the same time as the Geneva roller 54 enters the Geneva wheel 56, the Geneva indexed switch 172 is moved to its other position which opens the holding circuit for relay 200. When relay 200 drops out the motor is energized through the Geneva indexed switch 172, and contacts 208, 212 and 214. The Geneva driver is now fully into the wheel and imparting rotation to the turret 30, stop drums 70 and 132 and programmer. As the roller 54 leaves the Geneva wheel 56 the second cam on the driver again moves the Geneva indexed switch 172 to its normal position. If a skip station programmed dog (not shown) has not been set on this particular station of the turret, the circuit is then broken to the motor rectifier bridge 210 to lift turret solenoid 203 and to relay 211. Current to the DC motor 44 is shut off, the dynamic brake resistor 218 is placed across the armature instantly stopping the motor 44, and the hydraulic valve is shifted valving oil to the hold down side of the cylinder 114 and pulling the top plate of the turret down. This again closes the lift turret switch 160 energizing relay 206. The inertia in the rotating system, the DC voltage across the armature which determines the motor speed, and the value of the armature resistor 218 are tailored together to stop the Geneva driver after exactly one-half revolution.

If the skip station dogs on the programmer are set for one or more stations, the turret will keep on indexing as the skip station switch 186 will over ride the Geneva indexed switch circuit completing the circuit to the bridge rectifier 210, lift turret solenoid 203, and relay 211, even though the Geneva index switch 172 is opening and closing while this occurs. As soon as a station is reached where no skip station dog has been set on the programmer, the Geneva index switch 172 will shut off the indexing as previously described.

While this invention has been described, it will be understood that it is capable of further modification, and this application is intended to cover any variations, uses and/or adaptations of the invention following in general, the principle of the invention and including such departures from the present disclosure as come within known or customary practice in the art to which the invention pertains, and as may be applied to the essential features hereinbefore set forth, as fall within the scope of the invention or the limits of the appended claims.

What I claim is:

1. An automatic machine tool including:
   a. a bed,
   b. a headstock having a spindle mounted at one end of said bed,
   c. a carriage mounted for longitudinal travel on said bed,
   d. a cross slide carried by said carriage,
   e. a turret mounted on said cross slide for travel transversely of said bed,
   f. a programming mechanism including mechanical switch-operating means mounted on and positioned laterally of said bed,
   g. said programming mechanism including carriage stop means,
   h. means operatively connecting said carriage, said cross slide, said turret, and said programming mechanism,
   i. said connecting means permitting adjustable movement of said programming means independently of said carriage.
2. An automatic machine tool as in claim 1 and wherein:
   a. said programming mechanism is positioned between the ends of said bed.
3. An automatic machine tool as in claim 2 and including:
   a. adjustment means for changing the position of said programming mechanism with respect to said bed.
4. An automatic machine tool as in claim 3 and including:
   a. stop means for controlling the longitudinal and transverse travel of said turret and said cross-slide.
5. An automatic machine tool as in claim 4 and wherein:
   a. said stop means includes a first stop member for controlling the longitudinal travel of said turret and said cross slide, and
   b. a second stop member for controlling the transverse travel of said turret on said cross-slide.
6. An automatic machine tool as in claim 5 and wherein:
   a. said first stop member includes a first stop drum mounted on said programming mechanism, and
   b. said second stop member includes a second stop drum mounted on said cross slide.
7. An automatic machine tool as in claim 6 and wherein:
   a. said first stop drum includes a plurality of radially spaced, axially adjustable stop screws for contacting said cross slide, and
   b. said second stop drum includes a plurality of radially spaced, axially adjustable stop screws for contacting said turret.
8. An automatic machine tool as in claim 7 and including:
   a. power means for driving said programming mechanism said first and second stop drums, and said turret in programmed relationship.
9. An automatic machine tool as in claim 8 and wherein:
   a. said power means includes a high speed, electric motor.
10. An automatic machine tool as in claim 8 and wherein:
    a. said second stop drum is mounted on said cross slide and is substantially perpendicular to said bed, and
    b. wherein the axis of said stop drum is transverse to the longitudinal axis of said bed.
11. An automatic machine tool as in claim 10 and including:
    a. said turret having indexing and non-indexing positions,
    b. means for sensing when said turret is in said indexing position and
    c. means for indexing said turret while said turret is in said indexing position.
12. An automatic machine tool as in claim 11 and including:
    a. means for disengaging said indexing means when said turret moves from said indexing position.
13. An automatic machine tool including:
    a. a bed,
    b. a headstock having a spindle mounted at one end of said bed,
    c. cross slide means mounted for longitudinal travel on said bed,
    d. at least one slot in one side of said bed and extending parallel to said bed,
    e. a programming mechanism including mechanical switch-operating means,
    f. said programming mechanism including carriage stop means,
    g. means mounting said programming mechanism in said slot laterally of said bed,
    h. means operatively connecting said programming mechanism and said cross slide means for programmed indexing of said cross slide means, and i. said connecting means permitting adjustable movement of said programming means independently of said cross slide means.

14. An automatic machine tool as in claim 13 and wherein:
a. said programming mechanism is positioned between the ends of said bed.

15. An automatic machine tool as in claim 14 and including:
a. adjustment means for changing the position of said programming mechanism with respect to said bed.

16. An automatic machine tool as in claim 15 and wherein:
a. said at least one slot is substantially T-shaped in cross section.

17. An automatic machine tool as in claim 16 and including:
a. a stop drum mounted on said programming mechanism and having a longitudinal axis substantially parallel to said bed for controlling the longitudinal travel of said cross slide means, and
b. a stop member adjustably mounted on said cross slide means, and
c. at least one adjustable stop rod adjustably mounted in said stop drum for contacting said stop member.

18. An automatic machine tool as in claim 17 and wherein:
a. said stop drum is mounted above said bed.

19. An automatic machine tool as in claim 18 and including:
a. said programming mechanism includes a plurality of gear members each having an axis of rotation, and
b. said axis of rotation being substantially parallel to said bed.

20. An automatic machine tool as in claim 1 and wherein:
a. said bed includes at least one longitudinally extending substantially vertical surface and at least one longitudinally extending substantially horizontal surface,
b. said carriage being mounted on one of said surfaces, and
c. said programming mechanism being mounted on the other of said surfaces.

21. An automatic machine tool as in claim 13 and wherein:
a. said bed includes at least one longitudinally extending substantially vertical surface and at least one longitudinally extending substantially horizontal surface,
b. said cross slide means being mounted on one of said surfaces, and
c. said programming mechanism being mounted on the other of said surfaces.

* * * * *